United States Patent
Duan et al.

(10) Patent No.: US 9,013,846 B2
(45) Date of Patent: Apr. 21, 2015

(54) ELECTRO-STATIC DISCHARGE PROTECTION CIRCUIT AND METHOD FOR DRIVING THE SAME AND DISPLAY PANEL

(71) Applicant: BOE Technology Group Co., Ltd., Beijing (CN)

(72) Inventors: Liye Duan, Beijing (CN); Zhongyuan Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 35 days.

(21) Appl. No.: 14/074,914

(22) Filed: Nov. 8, 2013

(65) Prior Publication Data

US 2014/0126093 A1    May 8, 2014

(30) Foreign Application Priority Data

Nov. 8, 2012    (CN) .......................... 2012 1 0444076

(51) Int. Cl.
    *H02H 9/04*    (2006.01)
    *G02F 1/1362*  (2006.01)

(52) U.S. Cl.
    CPC .......... *H02H 9/044* (2013.01); *G02F 1/136204* (2013.01)

(58) Field of Classification Search
    CPC .......................... G02F 1/136204; H02H 9/044
    USPC .......................................................... 361/56
    See application file for complete search history.

(56) References Cited

U.S. PATENT DOCUMENTS

| 6,043,971 | A * | 3/2000 | Song et al. ..................... 361/111 |
| 2005/0285984 | A1* | 12/2005 | Tsai et al. ........................ 349/40 |
| 2006/0077162 | A1* | 4/2006 | Chou et al. ...................... 345/92 |
| 2006/0119757 | A1* | 6/2006 | Tsao ............................... 349/40 |
| 2006/0145951 | A1* | 7/2006 | Watanabe et al. ............... 345/55 |
| 2006/0279667 | A1* | 12/2006 | Tsai et al. ........................ 349/40 |
| 2007/0268420 | A1* | 11/2007 | Tsai et al. ........................ 349/40 |
| 2009/0072314 | A1 | 3/2009 | Okumura et al. |
| 2011/0285690 | A1* | 11/2011 | Li et al. ......................... 345/212 |

FOREIGN PATENT DOCUMENTS

| CN | 101241908 A | 8/2008 |
| CN | 101877351 A | 11/2010 |

(Continued)

OTHER PUBLICATIONS

Notification of the First Office Action and search report from Chinese Patent Office for priority application 201210444076.4 dated Sep. 3, 2014 with English translation.

*Primary Examiner* — Scott Bauer (74) *Attorney, Agent, or Firm* — Frommer Lawrence & Haug LLP; Ronald R Santucci (57) ABSTRACT

The invention discloses an ESD protection circuit and a method for driving the same and a display panel. The ESD protection circuit in the present invention comprises: a first TFT with a drain connected to a data signal line, a source and a gate connected together as a node; a second TFT with a drain connected to a first power supply line, a source connected to the data signal line, and a gate connected to the node; a third TFT with a drain connected to the data signal line, a source connected to a second power supply line, and a gate connected to a third power supply line; a forth TFT with a drain connected to the node, a source and a gate connected to the second power supply line; and a bootstrap capacitor connected between the node and the data signal line.

17 Claims, 6 Drawing Sheets

(56) References Cited

FOREIGN PATENT DOCUMENTS

| | | | |
|---|---|---|---|
| CN | 102651547 | A | 8/2012 |
| CN | 102655145 | A | 9/2012 |
| JP | 11-186501 | A | 7/1999 |
| JP | 2007-258998 | A | 10/2007 |

* cited by examiner

ELECTRO-STATIC DISCHARGE
PROTECTION CIRCUIT AND METHOD FOR
DRIVING THE SAME AND DISPLAY PANEL

FIELD OF THE INVENTION

The invention relates to the field of liquid crystal display and organic light-emitting display, and particular to a electrostatic discharge protection circuit and a method for driving the same and a display panel.

BACKGROUND OF THE INVENTION

An Electro-Static Discharge (ESD) protection circuit is an important part of TFT (thin film transistor)-Liquid Crystal Display (TFT-LCD) panel and emerging Active Matrix/Organic Light Emitting Diode (AMOLED) panel, and protects display devices from electrostatic damage in manufacturing, transporting and operating.

Figure 1:
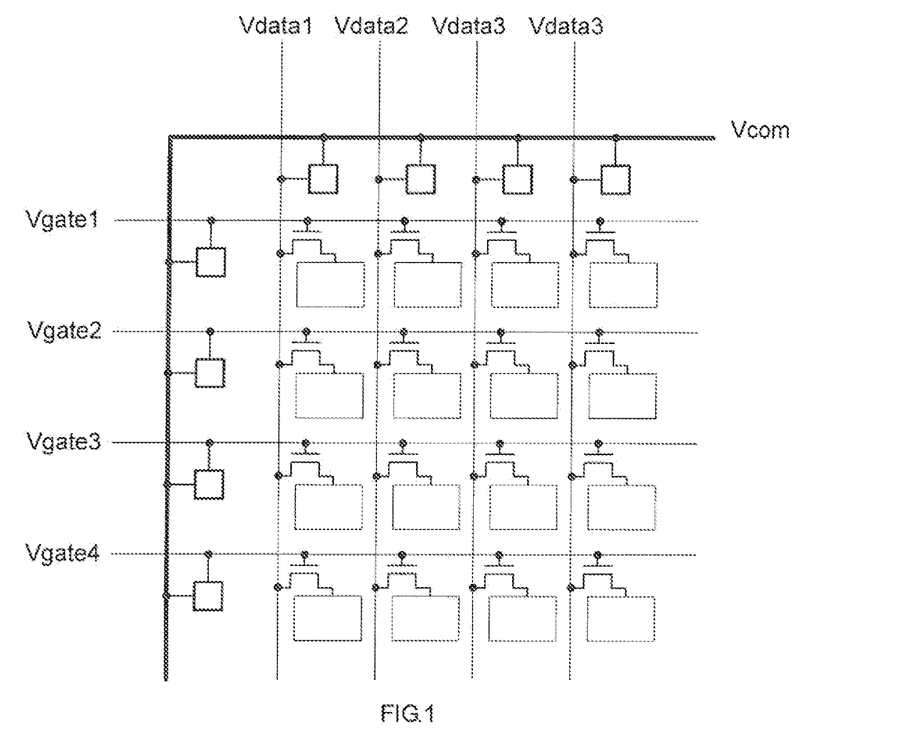
FIG. 1 is a diagram of an array of pixel units and the ESD protection circuit at the periphery thereof in the prior art.
Figure 2:
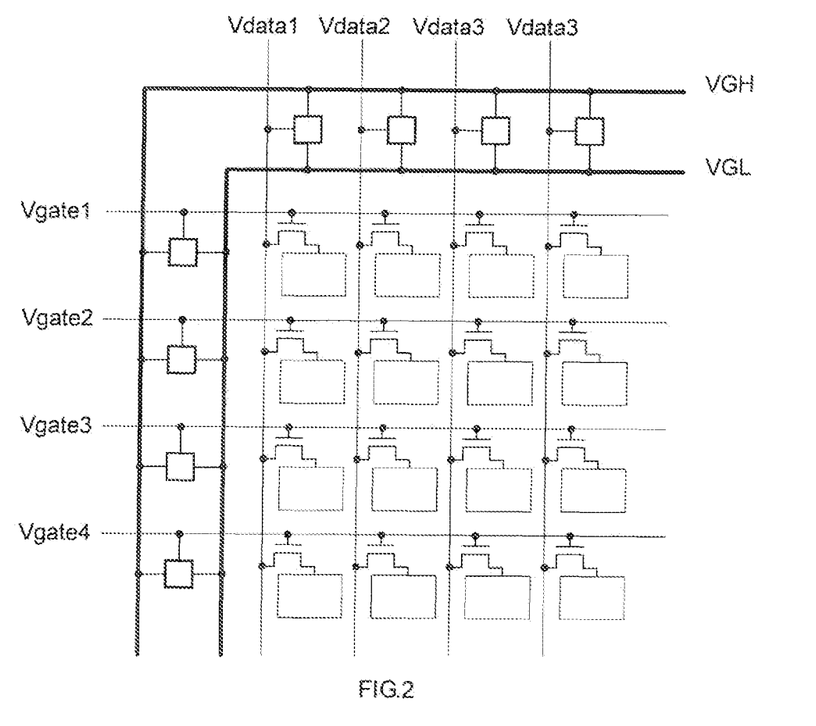
FIG. 2 is a diagram of another array of pixel units and the ESD protection circuit at the periphery thereof in the prior art.

FIG. 1 is a diagram of an ESD protection circuit in a usual display panel with only a $V_{com}$ line, and FIG. 2 is a diagram of a display panel with a VGH line and a VGL line, and the display panel usually comprises a gate driving circuit. The ESD protection circuit in the display panel shown in FIG. 1 operates as follows: in normal operation of the display panel, only leakage current or small positive current is discharged from the $V_{data}$ line (or $V_{gate}$ line) to the $V_{com}$ line. When an ESD occurs, positive charges and negative charges are discharged quickly to the $V_c$ line respectively so as to protect interior pixel units in array from damage. The ESD protection circuit in the display panel shown in FIG. 1 is simplest in structure, but has a major disadvantage, that is, when there is a voltage difference larger than threshold voltage Vth of a TFT between the $V_{data}$ line (or $V_{gate}$ line) and the $V_{com}$ line, there may be a forward current discharging to the $V_{com}$ line, which has adverse effect on the display panel itself and the peripheral driving circuit thereof. The difference of the ESD protection circuit in the display panel shown in FIG. 2 from the ESD protection circuit in the display panel shown in FIG. 1 is that, when an ESD occurs, positive charges and negative charges discharge quickly to the VGH line and the VGL line respectively, but in normal operation of the display panel, there is small leakage current flowing from the $V_{data}$ line (or $V_{gate}$ line) to the VGH line and the VGL line.

U.S. Pat. No. 6,515,644 discloses several conventional ESD protection circuits, as shown in FIGS. 3 and 4.

Figure 3:
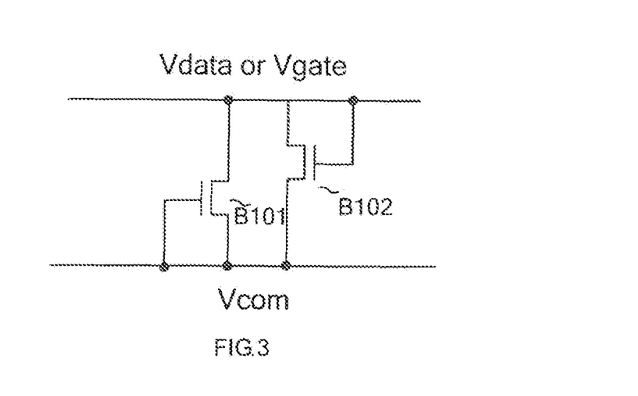
FIG. 3 is a diagram of a conventional ESD protection circuit mentioned in the U.S. Pat. No. 6,515,644.
Figure 4:
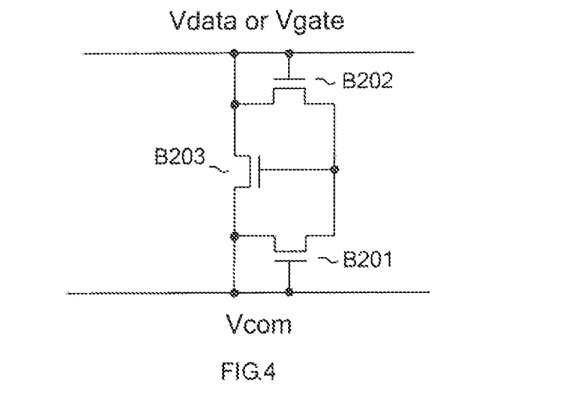
FIG. 4 is a diagram of another conventional ESD protection circuit mentioned in the U.S. Pat. No. 6,515,644.

The ESD protection circuit shown in FIG. 3 is formed by a TFT B101 and a TFT B102 each of which is connected to form a diode, and operates as follows: when there are positive charges accumulated on the $V_{data}$ line (or $V_{gate}$ line), the TFT B102 is turned on, the positive charges on the $V_{data}$ line (or $V_{gate}$ line) are discharged to the $V_{com}$ line, and when there are negative charges accumulated on the $V_{data}$ line (or $V_{gate}$ line), the TFT B101 is turned on, the negative charges on the $V_{data}$ line (or $V_{gate}$ line) are discharged to the $V_{com}$ line. However, in normal operation of the display panel, above problem also exists, that is, when there is a voltage difference larger than threshold voltage $V_{th}$ of a TFT between the $V_{data}$ line (or $V_{gate}$ line) and the $V_{com}$ line, there may be a forward current discharging to the $V_{com}$ line, which has adverse effect on the display panel per se and the peripheral driving circuit thereof.

The ESD protection circuit shown in FIG. 4 resolves the leakage problem in normal operation of the display panel to some extent, and operates as follows: when there are positive charges accumulated on the $V_{data}$ line (or $V_{gate}$ line), the TFT B202 applies a positive voltage to the gate of the TFT B203 so that the TFT B203 is turned on, thereby charges are discharged from the $V_{data}$ line (or $V_{gate}$ line) to the $V_{com}$ line; and when there are negative charges accumulated on the $V_{data}$ line (or $V_{gate}$ line), the TFT B201 applies a positive voltage to the gate of the TFT B203 so that the TFT B203 is turned on, thereby charges are discharged from the $V_{data}$ line (or $V_{gate}$ line) to the $V_{com}$ line. Unlike the ESD protection circuit shown in FIG. 3, in the normal operation of the display panel shown in FIG. 4, only when there is a positive voltage difference larger than 2 times threshold voltage $V_{th}$ of a TFT (i.e., 2 $V_{th}$) between the $V_{data}$ line (or $V_{gate}$ line) and the $V_{com}$ line, a forward current may be discharged to the $V_{com}$ line, which resolves the leakage problem in normal operation state of the display panel to some extent.

Above ESD protection circuits largely eliminate the harm brought by ESD in a-Si (amorphous silicon) TFT LCD process. In a Low Temperature Poly-silicon (LTPS) TFT display panel integrated with a gate driving circuit, a VGH line and a VGL line are usually provided therein, thus the ESD protection circuit may be more properly designed.

Figure 5:
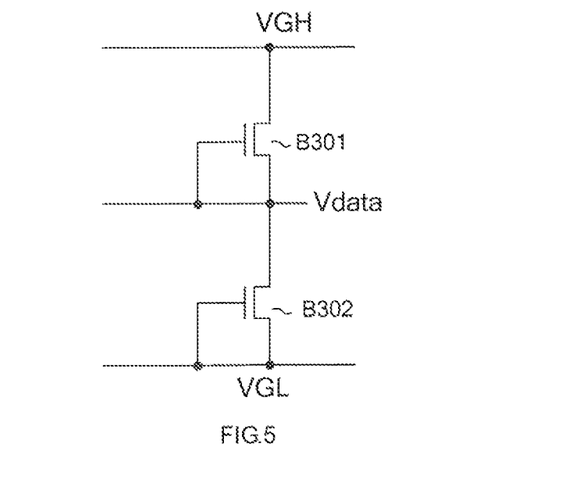
FIG. 5 is a diagram of an ESD protection circuit in the prior art.

For example, as shown in FIG. 5, an ESD protection circuit is formed by a TFT B301 and a TFT B302 each of which forms a two-terminals TFT diode element by connecting the gate and the drain thereof. For an enhanced TFT, in normal operation of the display panel display panel, no forward current is discharged to the $V_{com}$ line, and only extreme weak reverse leakage current is leaked to the VGH line and VGL line. When an ESD occurs, positive charges and negative charges are discharged rapidly to the VGH line and VGL line through the TFT B301 and the TFT B302 respectively.

However, as to the emerging oxide TFTs, serious leakage problem exists in all above ESD protection circuits wherein each of the TFTs forms a TFT diode, because current oxide TFTs usually are depletion-type devices, and for the depletion-type TFTs, when Vgs=0V, the TFTs are turned on. That is, each of the TFT diodes in above ESD protection circuits no longer can be regarded as a diode, because they are turned on regardless of whether the voltage between the two lines is positive or negative. For this reason, if existing ESD protection circuits are used for designing a display panel, in normal operation of the display panel, a large current will be discharged from the $V_{data}$ line (or $V_{gate}$ line) to the $V_{com}$ line (or VGH line and VGL line), so that the pixel units in array inside the display panel may operate abnormally, and the periphery driving circuits of the display panel may be damaged.

At present, in the ESD protection circuits designed by using the depletion-type TFTs, the serious leakage problem is solved to some extent by forming a voltage dividing circuit. In the ESD protection circuit shown in FIG. 6, the drain of the TFT B401 is connected to the VGH line, and its advantage is that, the voltage dividing circuit will not absorb the current on the $V_{com}$ line in normal operation of the display panel; but its disadvantage is that, when there are positive charges to be discharged on the $V_{data}$ line, the maximum value of $V_{net1}$ is limited by VGH, thus the degree of turning on for the TFT B403 is low, and charges are discharged slowly.

SUMMARY OF THE INVENTION

The invention provides an ESD protection circuit and a method for driving the same, and a display panel, which realize low power consumption of the ESD protection circuit when the display panel is in normal operation and quickly discharge of charges when an ESD occurs, thereby the security of the pixie circuits inside the display panel is guaranteed.

The invention provides an ESD protection circuit, comprising: a first TFT having a drain connected to a data signal line, a source and a gate connected together as a node; a second TFT having a drain connected to a first power supply line, a source connected to the data signal line, and a gate connected to the node; a third TFT having a drain connected to the data signal line, a source connected to a second power supply line, and a gate connected to a third power supply line; a forth TFT having a drain connected to the node, a source and a gate connected to the second power supply line; and a bootstrap capacitor connected between the node and the data signal line.

The invention provides a display panel using light-emitting devices, which comprises the above ESD protection circuit.

The invention provides a method for driving the above ESD (electro-static discharge) protection circuit, comprising: in normal operation of the display panel the first TFT and the forth TFT are turned on, and the second TFT and the third TFT are turned off; and when an ESD occurs, the second TFT is turned on so as to discharge the charges accumulated on the data signal line to the first power supply line, or the third TFT is turned on so as to discharge the charges accumulated on the data signal line to the second power supply line.

The invention provides an ESD protection circuit and a method for driving the ESD protection circuit and a display panel. The ESD protection circuit in the invention is formed by four TFTs and a bootstrap capacitor. In normal operation of the display panel, voltages of gates of the second TFT and the third TFT are set to be lower than that of sources thereof, so that only the first TFT and the forth TFT in the entire circuit are turned on, and a small current may be generated, thereby low power consumption is maintained and there is no effect on voltages of the data signal and the second power supply. When an ESD occurs, charges can be discharged quickly, so that the security of the pixie circuits inside the display panel is guaranteed.

DETAILED DESCRIPTION OF THE EMBODIMENTS

Embodiments of the invention provide an ESD protection circuit and a method for driving the same, and a display panel including the ESD protection circuit, which realize low power consumption of the ESD protection circuit when the display panel is in normal operation and quickly discharge of charges when an ESD occurs, thereby the security of pixel circuits inside the display panel is guaranteed.

An embodiment of the invention provides an ESD protection circuit, comprising: a first TFT with a drain connected to a data signal line, a source and a gate connected together as a node; a second TFT having a drain connected to a first power supply line, a source connected to the data signal line, and a gate connected to the node; a third TFT having a drain connected to the data signal line, a source connected to a second power supply line, and a gate connected to a third power supply line; a forth TFT having a drain connected to the node, a source and a gate connected to the second power supply line; and a bootstrap capacitor connected between the node and the data signal line.

Preferably, the first TFT and the forth TFT are TFTs whose operating currents are no more than 1 μA.

Preferably, the first TFT and the forth TFT are TFTs whose operating current are 0.1 μA.

Preferably, all of the TFTs (the first TFT to the forth TFT) in the ESD protection circuit are depletion-type TFTs.

Preferably, when all of the TFTs in the ESD protection circuit are N-type depletion-type TFTs, the voltage of the first power supply line is higher than that of the second power supply line, the voltage of the second power supply line is higher than that of the third power supply line, and the voltage of the data signal line is between the voltage of the first power supply line and the voltage of the second power supply line.

Preferably, all of the TFTs in the ESD protection circuit are P-type depletion-type TFTs, the voltage of the first power supply line is lower than that of the second power supply line, and the voltage of the second power supply line is lower than that of the third power supply line, and the voltage of the data signal line is between the voltage of the first power supply line and the voltage of the second power supply line.

Preferably, the bootstrap capacitor is a metal oxide semiconductor MOS bootstrap capacitor. Using MOS bootstrap capacitor is just a preferable solution, other bootstrap capacitors may be used, such as a bootstrap capacitor with a structure of two metal layers.

Hereinafter, the invention will be described in detail with reference to drawings and embodiments.

Embodiment 1

Figure 7:
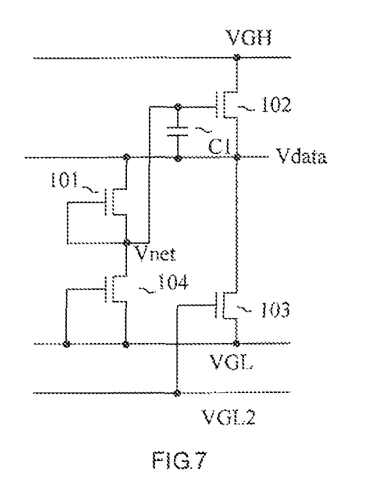
FIG. 7 is a diagram of an ESD protection circuit formed with depletion type NTFTs according to an embodiment of the invention.

Referring to FIG. 7, the embodiment provides an ESD protection circuit, comprising: a first TFT 101 having a drain connected to a data signal line ($V_{data}$ line), a source and a gate connected together as a node $V_{net}$; a second TFT 102 having a drain connected to a first power supply line (VGH line), a source connected to the $V_{data}$ line and a gate connected to the node $V_{net}$; a third TFT 103 having a drain connected to the $V_{data}$ line, a source connected to a second power supply line (VGL line), and a gate connected to a third power supply line (VGL2 line); a forth TFT 104 having a drain connected to the node $V_{net}$, a source and a gate connected to the VGL line; and a bootstrap capacitor C1 connected between the node $V_{net}$ and the $V_{data}$ line.

In the embodiment 1, all of the TFTs are N-type depletion-type TFTs, wherein the voltage of the VGH line is higher than that of the VGL line, the voltage of the VGL line is higher than that of the VGL2 line, and the voltage of the $V_{data}$ line is between the voltage of the VGH line and the VGL line. In general, the voltages of the VGH line and the VGL lines are high level and low level of a gate scan signal respectively.

It should be noted that, as a preferable solution, in the embodiment 1, the first TFT and the forth TFT are depletion type TFTs whose operating current is no more than 1 μA, for example, the first TFT and the forth TFT are depletion type TFTs whose operating current is 0.1 μA. The advantage of this is that normally inputting signal will not be affected and the power consumption will be properly reduced. Meanwhile, the bootstrap capacitor C1 is a metal oxide semiconductor MOS capacitor which occupies small area and the capacitance value in unit area is large, thus it helps to produce. Above description will be the same in following embodiment 2, so this will not be discussed again below.

In the ESD protection circuit in the embodiment 1, the voltage of the gate of the second TFT 102 is set to be the voltage of the node $V_{net}$ which is lower than the voltage of the source thereof, the voltage of the gate of the third TFT 103 is set to be the voltage of the VGL2 line which is lower than the voltage of the source thereof, wherein the voltage of the node $V_{net}$ is obtained by dividing a voltage by the first TFT 101 and the forth TFT 104.

The operation of the ESD protection circuit is as follows.

when the display panel operates normally, the first TFT 101 and the forth TFT 104 are turned on, and the second TFT 102 and the third TFT 103 are turned off. When an ESD occurs, the second TFT 102 is turned on so that the charges accumulated on the data signal line ($V_{data}$ line) are discharged to the VGH line, or the third TFT 103 is turned on so that the charges accumulated on the $V_{data}$ line are discharged to the VGL line.

Specifically, in the normal operation of the display panel, the first TFT 101 and the forth TFT 104 are turned on, a divided voltage is generated at the node $V_{net}$. As the voltage of the gate of the second TFT 102 is the voltage at the node $V_{net}$ which is lower than the voltage of the source thereof, and the voltage of the gate of the third TFT 103 is the voltage of the VGL2 line which is lower than the voltage of the source thereof, the second TFT 102 is turned off or lightly conducted (here, lightly conducting refers to a state in which the current is no more than 0.1 μA), and the third TFT 103 is turned off, thus there is no effect on the signals entering into the pixel units in array in the display panel. As the operation currents of the first TFT 101 and the forth TFT 104 are very small, thus the power consumption is low, and there is no effect on the voltages of the VGH line and the VGL line.

When an ESD occurs, and when there are positive charges accumulated on the $V_{data}$ line, the voltage on the $V_{data}$ line is raised, and the divided voltage at the node $V_{net}$ is also raised propotionally. When the voltage at the node $V_{net}$ is raised to the voltage of the VGH line plus Vth2 (wherein the Vth2 is the threshold voltage of the second depletion-type TFT 102 and is negative), the second TFT 102 is turned on, and when the voltage at the node $V_{net}$ is higher than the voltage of the VGH line, the charges accumulated on the $V_{data}$ line are discharged to the VGH line, at the same time, the bootstrap capacitor C1 speeds up the discharge process, so that the protection is more reliable. The bootstrap capacitor C1 operates as follows: when positive charges are accumulated on the $V_{data}$ line, the voltage of the $V_{data}$ line is raised, and as the voltage across the bootstrap capacitor C1 cannot change suddenly, the voltage at the node $V_{net}$ is raised synchronously, which results in that the conducting capability of the second TFT 102 is enhanced, and the discharging of the positive charges is sped up.

When there are negative charges accumulated on the data signal line $V_{data}$, the voltage on the data signal line $V_{data}$ is reduced, and when the voltage of the data signal line $V_{data}$ is reduced to the voltage of the third power supply line VGL2 minus Vth3 (wherein the Vth3 is the threshold of the third depletion-type TFT 103 and is negative), the third TFT 103 is in reverse state wherein the source and the drain are exchanged with each other, at this time, the third TFT 103 is turned on, so that the negative charges are discharged to the second power supply line VGL.

When an ESD occurs, the magnitude of the discharge current is proportional to the square of the voltage between the source and the drain. When there are positive charges accumulated on the data signal line $V_{data}$, the voltage of the $V_{data}$ line is raised, at this time, the conducting capability of the first TFT 101 is enhanced, and the voltage at the node $V_{net}$ is also raised. When the voltage at the node $V_{net}$ reaches to the voltage of the VGH line plus Vth2, a current flowing from the $V_{data}$ line to the VGH line via the second TFT 102 is proportional to $(V_{net}-VGH-Vth2)^2$. Moreover, compared to the ESD protection circuit in FIG. 6, in the ESD protection circuit shown in FIG. 7, the maximum voltage at the node $V_{net}$ is not restrained by the VGH. In contrast, when there are negative charges accumulated on the $V_{data}$ line, the voltage of the $V_{data}$ line is reduced, and when the voltage of the $V_{data}$ line reaches to the voltage of the VGL2 line minus Vth3 (which may be simply expressed as VGL2-Vth3), a current flowing from the $V_{data}$ line to the VGL line via the third TFT 103 is proportional to $(VGL-V_{data}-Vth3)^2$. Therefore, when an ESD occurs, the ESD protection circuit shown in FIG. 7 can discharge the charges quickly, so as to avoid the damage of the pixel units in array inside the display panel.

In order to verify the case of the leakage current of the ESD protection circuit when the display panel is in normal operation, following circuit simulations for comparison of the leakage currents in the ESD protection circuit shown in FIG. 7 and the ESD protection circuit shown in FIG. 5 are conducted.

For the simulations, except the structures of the ESD protection circuits are different from each other, the other conditions are the same. For example, the same simulation model is used and both the ESD protection circuits comprise N-type TFTs with the threshold voltage of −2V. In order to facilitate comparison, the aspect ratios of the TFT 102 and TFT 103 in FIG. 7 and the TFT B301 and TFT B302 in FIG. 5 are designed to be the same, i.e. 20 μm/4 μm. The voltages of the VGH lines in both the ESD protection circuits are 7V, the voltages of the VGL lines in both the ESD protection circuits are −3V, and the voltage of the VGL2 line in FIG. 7 is −5V. In this case, the $V_{data}$ line is scanned by voltages from 0V to 4V, so as to check the leakage current flowing from the $V_{data}$ line to the VGL line and the VGH line.

Figure 8:
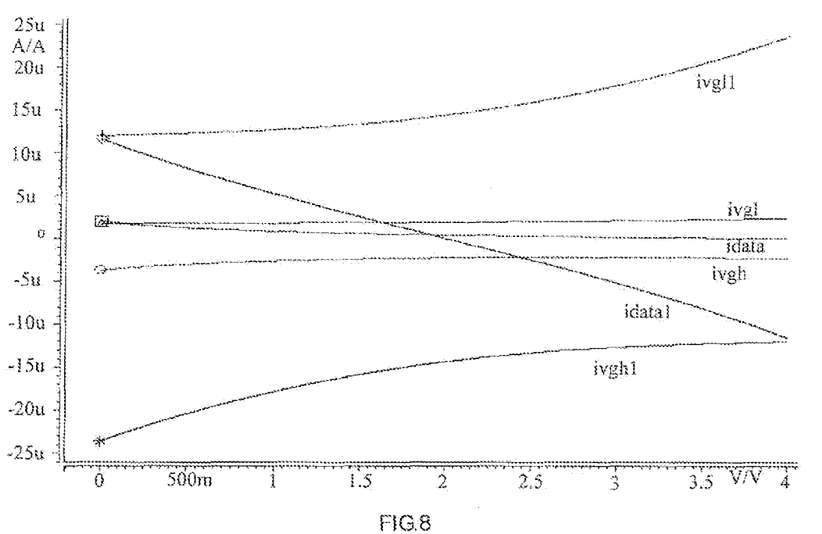
FIG. 8 is a comparison diagram of the leakage currents generated respectively in the ESD protection circuit shown in FIG. 7 and the ESD protection circuit shown in FIG. 5 when the ESD protection circuits are formed with depletion type TFTs.

In FIG. 8, from the current graphs denoted by ivgh1 (indicating the current flowing from the $V_{data}$ line to the VGH line in FIG. 5), ivgl1 (indicating the current flowing from the $V_{data}$ line to the VGL line in FIG. 5), idata1 (indicating a sum current flowing from the VGH and VGL lines to the $V_{data}$ line in FIG. 5), it can been see that, for the ESD protection circuit shown in FIG. 5, during all the scans for the $V_{data}$ line, there may be a large leakage current whose absolute value is more than 10 μA. In comparison, for the ESD protection circuit shown in FIG. 7, from the graphs denoted by ivgh (indicating the current flowing from the $V_{data}$ line to the VGH line in FIG. 7), ivgl (indicating the current flowing from the $V_{data}$ line to the VGL line in FIG. 7), idata (indicating a sum current flowing from the VGH and VGL lines to the $V_{data}$ line in FIG. 7), during all the scans for the $V_{data}$ line, there are only small leakage currents less than 5 μA in the TFTs.

Figure 6:
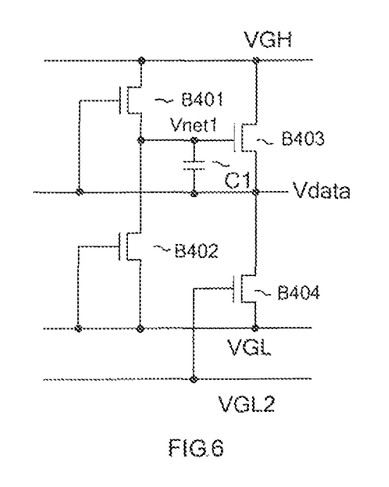
FIG. 6 is a diagram of an ESD protection circuit formed with depletion type NTFTs which form a voltage dividing circuit in the prior art.

In order to verify the advantage that the maximum voltage at the node $V_{net}$ is not restricted by the VGH, following circuit simulations for comparison between the ESD protection circuit shown in FIG. 7 and the ESD protection circuit shown in FIG. 6 are conducted.

For the simulations, except the connections of the first TFT 101 shown in FIG. 7 and the corresponding TFT B401 in FIG. 6 are different from each other, the other conditions are the same. For example, the same simulation model is used and both the ESD protection circuits comprise N-type TFTs with a threshold voltage of −2V. In order to facilitate comparison, the aspect ratios of the TFT 102, TFT 103 and the TFT B301, TFT B302 are designed to be the same, and the voltages of the VGH lines in both the ESD protection circuits are 7V, and the voltages of the VGL lines in both the ESD protection circuits are −3V, and the voltages of the VGL2 lines in both the ESD protection circuits are −6V. In this case, the $V_{data}$ line is scanned by voltages in a range from −7V to 15V, so as to check the protection current flowing from the $V_{data}$ line to the VGL line and the VGH line.

Figure 9:
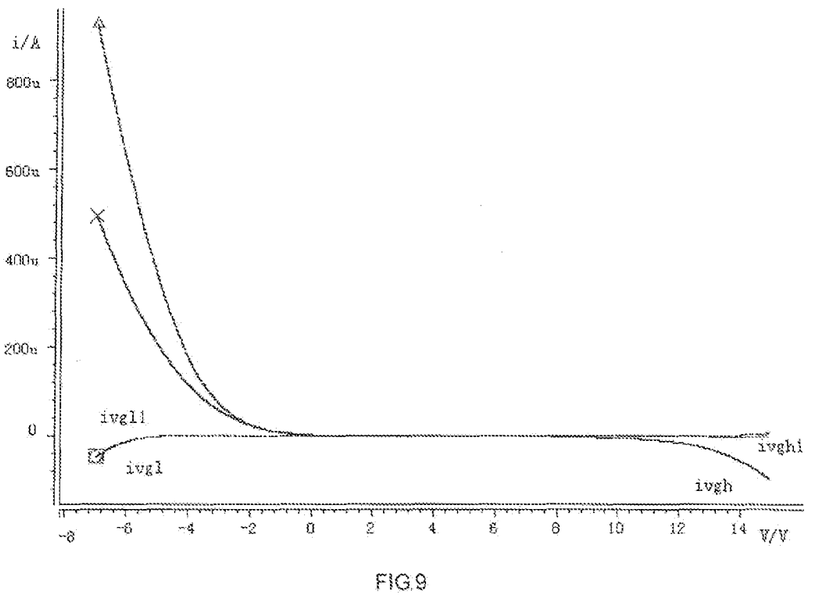
FIG. 9 is a comparison diagram of discharges in the ESD protection circuit shown in FIG. 7 and the ESD protection circuit shown in FIG. 6 when an ESD occurs.

FIG. 9 shows the discharge comparison between the ESD protection circuit in FIG. 7 and the ESD protection circuit shown in FIG. 6. It can be seen from FIG. 9, in case of negative charges being accumulated on the $V_{data}$ line, that is, the voltage on the $V_{data}$ line is negative, the graph ivgl1 (indicating a current flowing from the $V_{data}$ line to the VGL line) for the compared circuit (i.e., the ESD protection circuit shown in FIG. 6) is almost overlapped with the graph ivgl (indicating a current flowing from the $V_{data}$ line to the VGL line) for the present embodiment (i.e., the ESD protection circuit shown in FIG. 7. However, in case of positive charges being accumulated on the $V_{data}$ line, that is, the voltage on the line $V_{data}$ is positive, the current indicated by ivgh1 for the compared circuit is far smaller than the current indicated by ivgh for the present embodiment, which shows that the discharge of the positive charges in the ESD protection circuit of the present embodiment is far better than that in the compared circuit, that is, the positive charges in the ESD protection circuit of the present embodiment is discharged more rapidly.

Embodiment 2

Hereinafter, embodiment 2 will be described with reference to FIG. 10.

Figure 10:
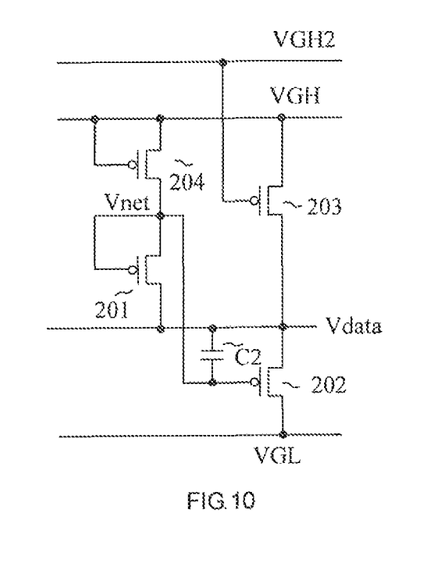
FIG. 10 is a diagram of another ESD protection circuit formed with depletion type NTFTs according to an embodiment of the invention.

Referring to FIG. 10, the ESD protection circuit of the embodiment 2 comprises: a first TFT 201 having a drain connected to a data signal line (that is, $V_{data}$ line), a source and a gate connected together as a node $V_{net}$; a second TFT 202 having a drain connected to a first power supply line (that is, VGH line), a source connected to the $V_{data}$ line, and a gate connected to the node $V_{net}$; a third TFT 203 having a drain connected to the $V_{data}$ line, a source connected to a second power supply line (that is, VGL line), and a gate connected to a third power supply line (that is, VGL2 line); a forth TFT 204 having a drain connected to the node $V_{net}$ a source and a gate connected to the VGL line; and a bootstrap capacitor C2 connected between the node $V_{net}$ and the $V_{data}$ line.

In the embodiment 2, all of the TFTs are P-type depletion-type TFTs, wherein the voltage of the VGL line is lower than that of the VGH line, the voltage of the VGH line is lower than that of the VGH2 line, the voltage of the $V_{data}$ line is between the voltages of the VGL line and the VGH2 line. In general, the voltages of the VGH lines and the VGL line are the high level and the low level of a gate scan signal respectively.

The operation of the ESD protection circuit is as follows.
In normal operation of the display panel, the first TFT 201 and the forth TFT 204 are turned on, and the second TFT 202 and the third TFT 203 are turned off. When an ESD occurs, the second TFT 202 is turned on so that the charges accumulated on the $V_{data}$ line are discharged to the VGL line, or the third TFT 203 is turned on so that the charges accumulated on the $V_{data}$ line are discharged to the VGH line.

Specifically, in normal operation of the display panel, the first TFT 201 and the forth TFT 204 with a small aspect ratio are turned on, a divided voltage is generated at the node $V_{net}$ as the voltage of the gate of the second TFT 202, at this time, the second TFT 202 is not turned on or lightly conducted, and the third TFT 203 is not turned on, thus there is no effect on the signals entering into the pixel units in array. As only small currents are generated in the first TFT 201 and the forth TFT 204, the power t0 consumption is low and there is no effect on the voltages on the $V_{data}$ line and VGH line.

When an ESD occurs, when there are positive charges accumulated on the $V_{data}$, line, the voltage of the $V_{data}$ line (i.e. the source voltage of the third TFT 203) is raised. When the voltage of the $V_{aata}$ line reaches to the voltage of the VGH2 line plus Vth3, the third TFT 203 is turned on, and when the voltage of the $V_{data}$, line is higher than the voltage of the VGH line, the positive charges are discharged from the $V_{data}$ line to the VGH line via the third TFT 203. When there are negative charges accumulated on the data signal $V_{data}$ line, the voltage at the node $V_{net}$ is the voltage of the gate of the second TFT 202, and when the voltage at the node $V_{net}$ reaches to the voltage of the VGL line minus Vth2, the second TFT 202 is turned on, so that the negative charges are discharged from the $V_{data}$ line to the VGL line via the second TFT 202. The bootstrap capacitor C2 speeds up the discharge process, that is, when negative charges are accumulated on the $V_{data}$ line, the voltage of the $V_{data}$ line is reduced, and as the voltage across the bootstrap capacitor C2 cannot change suddenly, the voltage at the node $V_{net}$ is reduced synchronously, which results in that the conducting capability of the second TFT 202 is enhanced, and the discharging of the negative charges is sped up.

In another aspect of the invention, a display panel including the ESD protection circuit in above embodiment 1 or embodiment 2 is provided.

It should be noted that, in the present invention, the voltages of the VGH line and the VGL line are respectively the high level and low level of the gate scan signal, and the VGH line and the VGL line may be leads dedicated for the ESD protection, they lead to external circuits and connect to a specific level, so that the anti-interference capacity of the display panel is enhanced, but the system of the external circuits will be more complicated.

In summary, the ESD protection circuit provided in the present invention is designed for depletion-type TFTs and is formed by four depletion-type TFTs and a bootstrap capacitor. In normal operation of the display panel, the first TFT and the forth TFT are turned on, a divided voltage generated due to the turn-on of the first TFT and the forth TFT is applied to the gate of the second TFT, so that the second TFT is turned off or is lightly conducted, and the third TFT is turned off, thereby there is no effect on the data signal entering into the pixel units in array. In addition, as only the first TFT and the forth TFT in the whole circuit generate very small current, the problem that large leakage current exists in the ESD protection circuit comprising oxide TFTs and other kinds of TFTs when the ESD protection circuit is in normal operation may be solved, low power consumption may be maintained and there is no effect on the voltages of the data signal line and the second power supply line. When an ESD occurs, currents between the $V_{data}$ line and the VGH line or between the $V_{data}$ line and the VGL line may be increased in proportion to the square of the gate-source voltage, so that the charges may be discharged quickly, protecting the pixel units inside the display panel being damaged by the ESD. In addition, for N-type TFTs, the bootstrap capacitor speeds up the discharge of the positive charges; for P-type TFTs, the bootstrap capacitor speeds up the discharge of the negative charges, so that the protection is more reliable.

Obviously, the persons skilled in the art could make many modifications and variants to the present invention without departing from the principle of the present invention. Any modification, equivalent substitution or the like falling within the spirits and the scopes of the present invention are intended to be included within the scope of protection of the present invention.

What is claimed is:

1. A electro-static discharge protection circuit, comprising:
    a first TFT having a drain connected to a data signal line, a source and a gate connected together as a node;
    a second TFT having a drain connected to a first power supply line, a source connected to the data signal line, and a gate connected to the node;
    a third TFT having a drain connected to the data signal line, a source connected to a second power supply line, and a gate connected to a third power supply line;
    a fourth TFT having a drain connected to the node, a source and a gate connected to a second power supply line; and
    a bootstrap capacitor connected between the node and the data signal line.

2. The electro-static discharge protection circuit according to claim 1, wherein the first TFT and the forth TFT are TFTs whose operating currents are less than 1 μA.

3. The electro-static discharge protection circuit according to claim 2, wherein the first TFT and the fourth TFT are TFTs whose operating currents are 0.1 μA.

4. The electro-static discharge protection circuit according to claim 1, wherein the first TFT to the fourth TFT are depletion-type TFTs.

5. The electro-static discharge protection circuit according to claim 2, wherein the first TFT to the fourth TFT are depletion-type TFTs.

6. The electro-static discharge protection circuit according to claim 3, wherein the first TFT to the fourth TFT are depletion-type TFTs.

7. The electro-static discharge protection circuit according to claim 4, wherein the first TFT to the fourth TFT are N-type depletion-type TFTs, the voltage of the first power supply line is higher than that of the second power supply line, the voltage of the second power supply line is higher than that of the third power supply line, and the voltage of the data signal line is between the voltage of the first power supply line and the voltage of the second power supply line.

8. The electro-static discharge protection circuit according to claim 5, wherein the first TFT to the fourth TFT are N-type depletion-type TFTs, the voltage of the first power supply line is higher than that of the second power supply line, the voltage of the second power supply line is higher than that of the third power supply line, and the voltage of the data signal line is between the voltage of the first power supply line and the voltage of the second power supply line.

9. The electro-static discharge protection circuit according to claim 6, wherein the first TFT to the fourth TFT are N-type depletion-type TFTs, the voltage of the first power supply line is higher than that of the second power supply line, the voltage of the second power supply line is higher than that of the third power supply line, and the voltage of the data signal line is between the voltage of the first power supply line and the voltage of the second power supply line.

10. The electro-static discharge protection circuit according to claim 4, wherein the first TFT to the fourth TFT are P-type depletion-type TFTs, the voltage of the first power supply line is lower than that of the second power supply line, and the voltage of the second power supply line is lower than that of the third power supply line, and the voltage of the data signal line is between the voltage of the first power supply line and the voltage of the second power supply line.

11. The electro-static discharge protection circuit according to claim 5, wherein the first TFT to the fourth TFT are P-type depletion-type TFTs, the voltage of the first power supply line is lower than that of the second power supply line, and the voltage of the second power supply line is lower than that of the third power supply line, and the voltage of the data signal line is between the voltage of the first power supply line and the voltage of the second power supply line.

12. The electro-static discharge protection circuit according to claim 6, wherein the first TFT to the fourth TFT are P-type depletion-type TFTs, the voltage of the first power supply line is lower than that of the second power supply line, and the voltage of the second power supply line is lower than that of the third power supply line, and the voltage of the data signal line is between the voltage of the first power supply line and the voltage of the second power supply line.

13. The electro-static discharge protection circuit according to claim 1, wherein the bootstrap capacitor is a metal oxide semiconductor MOS capacitor.

14. A method for driving the electro-static discharge protection circuit according to claim 1, wherein the electro-static discharge protection circuit is included in a display panel, the method comprises:
    when the display panel is in normal operation state, the first TFT and the fourth TFT are turned on, and the second TFT and the third TFT are turned off; and
    when an electro-static discharge occurs, the second TFT is turned on so as to discharge the charges accumulated on the data signal line to the first power supply line, or the third TFT is turned on so as to discharge the charges accumulated on the data signal line to the second power supply line.

15. The method for driving the electro-static discharge protection circuit according to claim 14, wherein when an electro-static discharge occurs, the second TFT is turned on so as to discharge the charges accumulated on the data signal line to the first power supply line, or the third TFT is turned on so as to discharge the charges accumulated on the data signal line to the second power supply line, further comprising:
    when the first TFT to the fourth TFT in the electro-static discharge protection circuit are N-type TFTs, and when positive charges are accumulated on the data signal line, the voltage at the node functions as the voltage applied to the gate of the second TFT, and when the voltage at the node is larger than or equal to the sum of the voltage of the first power supply line and the threshold voltage of the second TFT, the second TFT is turned on so that the positive charges are discharged to the first power supply line, wherein the bootstrap capacitor is configured to accelerate the discharge of the positive charges;
    when negative charges are accumulated on the data signal line, the third TFT is in reverse state wherein the source and the drain are exchanged, the voltage of the data signal line functions as the voltage applied to the source of the third TFT, and when the voltage of the data signal line is smaller than or equal to the difference between the voltage of the third power supply line and the threshold voltage of the third TFT, the third TFT is turned on so that the negative charges are discharged to the second power supply line.

16. The method for driving the electro-static discharge protection circuit according to claim 14, wherein when an electro-static discharge occurs, the second TFT is turned on so as to discharge the charges accumulated on the data signal line to the first power supply line, or the third TFT is turned on so as to discharge the charges accumulated on the data signal line to the second power supply line, further comprising:

when the first TFT to the fourth TFT in the electro-static discharge protection circuit are P-type TFTs, and when positive charges are accumulated on the data signal line, the voltage of the data signal line functions as the voltage applied to the drain of the third TFT, and when the voltage of the data signal line is larger than or equal to the sum of the voltage of the third power supply line and the threshold voltage of the third TFT, the third TFT is turned on so that the positive charges are discharged to the second power supply line; and when negative charges are accumulated on the data signal line, the voltage of the node functions as the voltage applied to the gate of the second TFT, and when the voltage of the node is smaller than or equal to the difference between the voltage of the first power supply line and the threshold voltage of the second TFT, the second TFT is turned on so that the negative charges are discharged to the first power supply line, wherein the bootstrap capacitor is configured to accelerate the discharge of the negative charges.

17. A display panel comprising an electro-static discharge protection circuit, wherein the electro-static discharge protection circuit comprising:

a first TFT having a drain connected to a data signal line, a source and a gate connected together as a node;

a second TFT having a drain connected to a first power supply line, a source connected to the data signal line, and a gate connected to the node;

a third TFT having a drain connected to the data signal line, a source connected to a second power supply line, and a gate connected to a third power supply line;

a fourth TFT having a drain connected to the node, a source and a gate connected to a second power supply line; and a bootstrap capacitor connected between the node and the data signal line.

* * * * *